Aug. 13, 1929.  A. A. SNEBOLD  1,724,686

VALVE

Filed March 21, 1924  2 Sheets-Sheet 1

INVENTOR
Albert A. Snebold.
BY
ATTORNEY

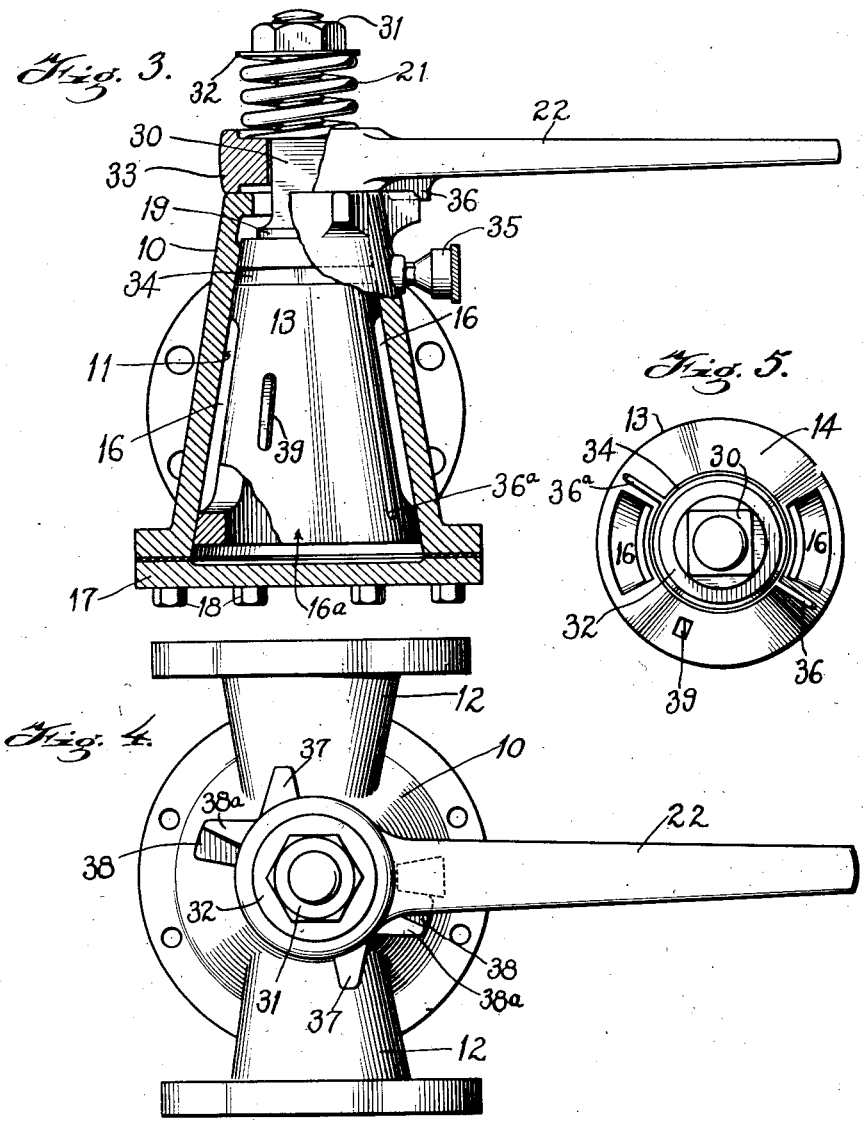

Patented Aug. 13, 1929.

1,724,686

UNITED STATES PATENT OFFICE.

ALBERT A. SNEBOLD, OF NATRONA, PENNSYLVANIA, ASSIGNOR TO THE DORR COMPANY, OF NEW YORK, N. Y., A CORPORATION OF DELAWARE.

VALVE.

Application filed March 21, 1924. Serial No. 700,743.

My invention is directed to improvements in rotary plug valves, and more particularly in valves of this type provided with a tapered plug and seat.

While valves embodying my invention may be adapted for a great variety of uses, they have been developed particularly for the handling of thick, heavy pulps, muds, slimes and the like such as are encountered in many metallurgical, chemical and waste disposal processes. Valves employed for this purpose are subject to a number of special difficulties due to the nature of the fluid, chief among which are the tendency to stick; filling up by the accumulation of solids in the valve or in both pipe lines and valve; the corrosive action of the fluid; abrasive action of the solids; the necessity for periodical cleaning with a minimum of disturbance of the system; and other special problems well known to those familiar with such processes.

The general object of my invention is to provide a valve adapted to operate efficiently under the conditions indicated, and which in particular will have a minimum tendency to stick or fill up with solids.

An ancillary object is to provide a valve construction which can readily be made of materials which will resist chemical attack, abrasion or both, but which will retain sufficient structural strength to insure durability and ready operation. In the present state of the art there are only a relatively limited number of materials adapted to resist the chemical action which is encountered in the processes above indicated, particularly the effects of acid or strong alkaline fluids. These resistant materials must be employed either by making therefrom all valve parts exposed to the fluid, or where the resistant material lacks sufficient structural strength to be employed in this manner, by making the valve parts of material having adequate strength and coating the exposed portions with resistant materials.

The former method, owing to the characteristics of the few materials known to be adapted for the purpose, makes it necessary to devise a special type of valve which can readily be made from such materials and which will operate satisfactorily in practice when constructed thereof. The latter method demands a construction in which the portions exposed to the fluid may be coated with resistant material by known processes so that the coating will be permanent and can be applied without excessive expense. I have devised and disclosed herewith a valve conforming to these requirements.

As heretofore indicated, my invention is especially directed to the type of plug valve having a conical or tapered plug and seat. In this type of valve the control of longitudinal movement of the plug is highly important, since it regulates the seating of the valve; that is, if the plug is forced into the seat too hard it will stick or jam, while if it is seated loosely a leak between plug and seat will occur. Furthermore, where the fluid is under pressure, and gets between the plug and seat it may have a tendency to force the plug endwise, progressively increasing the leak.

Springs have heretofore been employed to insure proper seating; but where the fluid is under pressure, with a corresponding tendency to leak past the plug, such a spring must be relatively strong. However, this arrangement makes it difficult to turn the plug, and greatly aggravates the tendency to stick and jam.

Others have also employed the pressure of the fluid in the valve to hold the plug against its seat; but with this arrangement it is necessary to maintain such pressure when the valve is turned off, to prevent the leakage that would occur if there were nothing to hold the plug on its seat. Such valves cannot be opened for inspection or cleaning without cutting off the connecting feed line.

An important object of my invention therefore is to provide a valve in which a relatively weak spring is combined with fluid pressure to maintain the valve plug firmly seated without preventing easy operation thereof. I furthermore prefer to employ a plug having a sharper taper than has heretofore been considered practicable for this type of valve, the angle between opposite sides of the plug being between 20 and 30°, though preferably 22°. This arrangement is highly advantageous in preventing sticking, one of the most serious objections to the tapered plug type of valve; and I have combined this arrangement with other features indicated to insure thorough seating of the plug and consequent elimination of leakage, a problem which is substantially different with a sharply tapered plug from that encountered where the usual taper is employed.

Under certain circumstances it is desirable to provide lubrication for the valve; and I have disclosed an efficient and relatively cheap construction for this purpose, so arranged that where lubrication is not desired there will be no complicated and unnecessary structure. Furthermore, the lubricant may be forced through conducting channels to reach the desired surface; and such channels may be arranged so that they are never exposed to the fluid in the valve.

If desired the pressure from the feed line may be maintained in the plug when the latter is closed; and I have provided a simple arrangement whereby such pressure is maintained when the plug is in normally closed position, but may be cut off in a simple and effective manner if it is desired to cut off completely the feed line as well as the discharge.

Valves employed in the manner indicated must be inspected frequently and cleaned occasionally; and they are often located in relatively inaccessible positions. I therefore have arranged the valve parts so that the interior may be accessible without cutting off or draining the connecting pipe lines, and which may be flushed out with ease. Other objects which I have attained are ready and rapid replacement of parts; simiplicity, strength and ease of manufacture; ready adjustability of spring pressure without opening the valve; and others which will be apparent from the following description, taken in connection with the accompanying drawing, in which Fig. 1 is a central vertical section on line 2—2 of Fig. 2.

Fig. 2 a top plan view, parts being broken away.

Fig. 3 is an endwise view of a modified form, parts being broken away and shown substantially in central transverse vertical section.

Fig. 4 is a top plan view of said modification.

Fig. 5 is a top plan view of the plug therein; and

Figs. 6, 7, and 8 are diagrammatic horizontal sectional views showing the plug in three positions.

Figure 1:
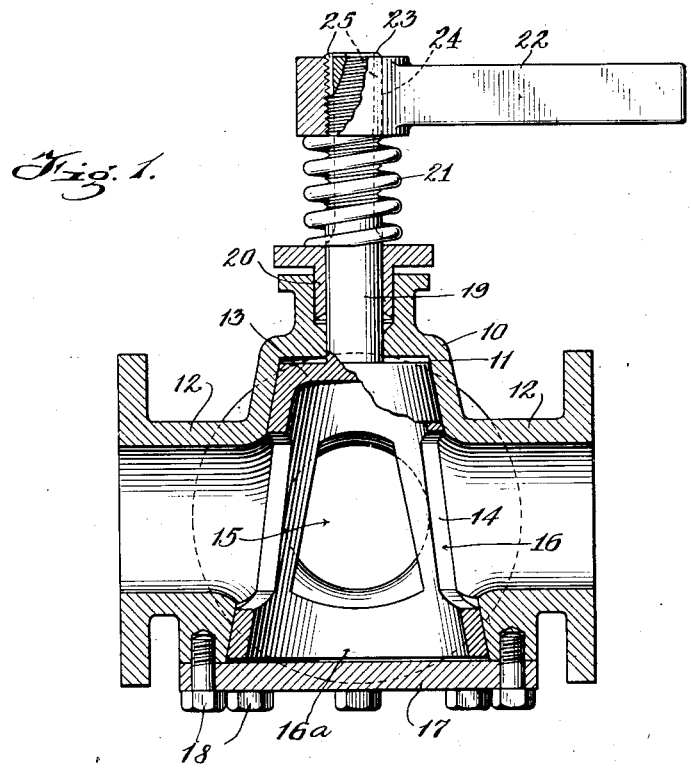
Figure 2:
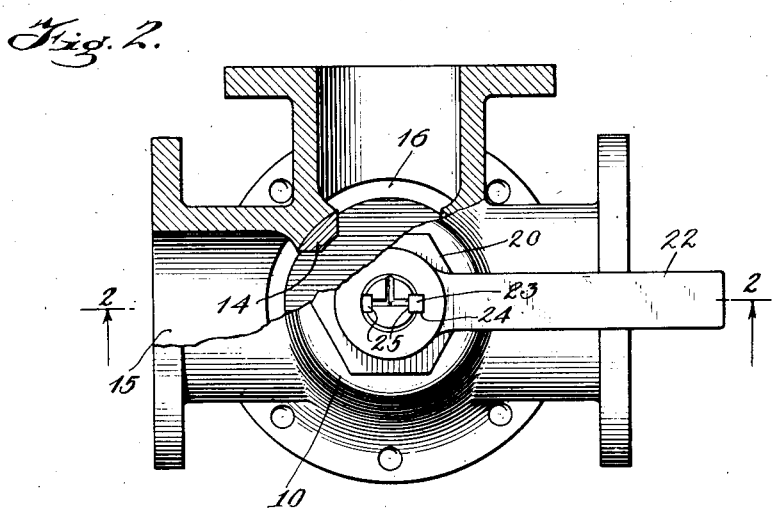

The form illustrated in Figs. 1 and 2 includes a valve body 10 having a tapered valve seat 11 formed therein, and provided with outlets 12. In the type shown in said figures three outlets are illustrated, but obviously any usual number of outlets may be employed, arranged in the various ways well known to those skilled in the art. Plug 13 is provided with an annular wall 14 the outside of which is tapered to fit accurately on seat 11, and having a relatively large central chamber 15 with an opening 16ᵃ adjacent the wider end of the plug. In the preferred form shown this opening extends entirely across the end of the plug, so that wall 14 is in effect a frusto-conical tube, which may very readily be constructed from various materials as heretofore indicated, particularly where molds are required. Suitable ports 16 in the plug wall 14 cooperate with the valve body openings connecting with outlets 12 in the usual way.

A removable closure is provided in the valve body adjacent the larger end of the plug to permit ready access to the plug interior, and is preferably adapted to permit ready removal of the plug. In the form shown I employ a cover plate 17 extending across an opening in valve body 10 larger than and in line with the large end of plug 13, and removably held in place on the valve body as by screws 18.

The valve stem 19 is preferably carried by the smaller end of the plug, and extends through the valve body in the usual way, a stuffing box 20 being employed if desired and for purposes of description and claims being considered a part of the valve body. While any of the usual types of stuffing box may be used, I may also employ a longitudinally movable gland 20, held in place by spring 21. The preferred form of construction has been so designed, however, that ordinarily no packing will be necessary.

In the preferred form shown the entire plug and stem are integral, and are so arranged that the unit may be very readily cast and machined.

For holding the plug on its seat I employ a spring, engaging directly or indirectly the valve body 10 and valve stem 19. A convenient arrangement for this purpose includes a helical spring 21 encircling the stem 19, pressing against the valve body and an abutment on stem 19, such as handle 22.

I also provide means for adjusting the compression of spring 21, as by threading handle 22 on stem 10; and may employ any usual device such as key 23 in keyway 24 in the handle and keyway 25 in the stem to prevent rotation of the handle on the stem after the spring compression has been adjusted. To obtain added refinement of adjustment I may provide a plurality of circumferentially spaced keyways in one of the cooperating members, as in the stem 19.

In the modified form shown in Figs. 3 to 8 inclusive, I have illustrated my invention as applied to a two way valve. This form includes a somewhat different arrangement of the stem and handle, the stuffing box being omitted. In this arrangement the stem 19 is provided with a squared shank 30 which fits a corresponding recess in handle 22. The upper part of the stem is threaded to receive a spring pressure adjustment nut 31; and spring 21 bears against the hub of handle 22 and a washer 32 adjustably held in place by the nut. The handle hub may be provided with an annular bearing ridge 33, reducing the frictional engagement with the valve body. It will be noted that with this arrangement the spring pressure is readily and permanently adjustable, and the parts are so arranged that in case the valve should become unseated and liquid should leak past the stem, the operator will be afforded material protection against spattering.

For lubricating the valve, if desired, I employ at least one annular lubricant channel in communication with a lubrication feed, and vertical grooves for distributing the lubricant from the channels to the desired portions of the plug and seat faces. These channels and grooves may be located on the plug and may include an annular channel 34 extending partly or entirely around the upper part of the plug above the ports and communicating with a suitable lubricant feed, such as grease cup 35 threaded into a bore in the valve body 10 registering with channel 34. With this arrangement, where lubrication is not desired a plug may be screwed into the bore without detracting from the appearance or efficiency of the valve. Obviously any number of grease cups may be used.

The distributing grooves 36ª extend downwardly from channel 34 along the faces of the plug into proximity with the bottom thereof. These are preferably arranged so that regardless of the plug position they will not be directly exposed to the fluid. This is conveniently accomplished, in the two way plug disclosed, by locating the grooves at opposite sides of the plug immediately adjacent a port therein, and by providing stop means such as lug 36 on handle 22 cooperating with stops 37 and 38 on the valve body 10 so arranged that in opening and closing the valve grooves 36 will travel over a substantial part of the valve seat but cannot pass the margin of the ports in the valve body.

Numerous obvious modifications in the construction and arrangement of the lubrication parts will be apparent, and come within the scope of my invention.

I may if desired provide means for maintaining within the plug a seating pressure exerted by the fluid, even when the plug is in closed position. For this purpose I employ a pressure port 39 in the plug body on the side adjacent the inlet so arranged that when the plug is in closed position said port will still be in communication with the feed line. This is illustrated in Fig. 6 showing the valve in open position and Fig. 7 which shows the closed position. Complementary pairs of stops 37, 38 may be employed permitting the location of handle 22 on either side of the valve, as may be convenient, and also the location of pressure port 39 adjacent either opening 12, so that either may be used as inlet.

Where it is desirable to cut the feed line off completely from the valve chamber suitable means permitting rotation of the plug beyond the normal closed position is preferably employed. I accomplish this object very simply by providing an auxiliary stop 38ª slightly beyond stop 38 the latter arresting handle 22 when the valve is in closed position, as shown in Fig. 7. The top of stop 38 is but slightly above the bottom of lug 36 on the handle; and the latter is arranged so that it may be lifted slightly against spring 21 either by sliding the handle hub on square shank 30 or by allowing a slight play at this point, the arrangement being such that when the handle is elevated lug 36 will slide over stop 38 and be arrested by stop 38ª with the plug in the position shown in Fig. 8, the inlet and outlet being both completely closed.

It will be noted that in the form shown the plug and valve body walls are in general of uniform thickness, and the portions exposed to the fluid are free from pockets and irregular contours, being almost entirely flat, cylindrical or conical, facilitating the construction of these parts by molding and machining, as well as the coating of the parts with resistant materials.

Furthermore a slight clearance may be provided between the small end of the plug and the valve body, allowing automatic take-up of wear and insuring firm seating of the plug. A similar clearance for the large end of the plug is also desirable as it permits the operator to free the plug in case of sticking without employing any special device or adjustment and without straining the parts, the only operation necessary being to press or tap on the end of stem 19.

In operation the pressure of spring 21 is adjusted to obtain the lightest pressure consistent with freedom from leakage under the particular conditions as to pressure and character of fluid encountered where the valve is used. In case the valve sticks it may be readily freed as already indicated by tapping on or otherwise depressing stem 19.

For cleaning purposes the valve may be flushed out readily, either through a port or by introducing the washing fluid in other well-known ways; and by depressing the valve stem the bearing surfaces of plug and seat may be washed without opening the valve. If desired the valve may be closed, plate 17 removed, and the entire interior of the valve cleaned. Where the lines become filled with solids the plug may be removed by taking off plate 17 and handle 22, giving direct access to the lines; and the plug may readily be repaired or replaced in the same manner.

While I have described a preferred form it will be apparent that modifications therein can be made without departing from my invention as defined in the claims. In particular, it will be noted that certain features of the valve and plug construction may be employed without spring seating means; and that considerable variations in the location and type of spring are possible.

I claim—

1. A valve comprised of a body including a plug seat, a rotary tapered plug engaging said seat, the plug having a central chamber extending through the larger end with inlet and outlet ports in the side walls of the plug, an auxiliary pressure inlet located between said ports, and stop means for arresting the rotation of the plug in closed position with the pressure port out of communication with said pressure line.

2. A valve comprised of a body including a plug seat, a rotary tapered plug engaging said seat, the plug having a central chamber extending through the larger end with inlet and outlet ports in the side walls of the plug, an auxiliary pressure inlet located between said ports, stop means for arresting the rotation of the plug in closed position with the pressure port in communication with said pressure line, and auxiliary stop means for arresting the rotation of the plug in closed position with the pressure inlet out of communication with the pressure line, said stop means and auxiliary stop means comprising fixed elements on the valve body and a cooperating element on the handle.

3. A valve comprised of a body including a plug seat, a rotary tapered plug engaging said seat having a central chamber extending through a larger end of the plug with inlet and outlet ports in the side walls of the plug; an auxiliary pressure port in said side walls, stop means for arresting the plug in closed position with the pressure port in communication with a pressure line; auxiliary stop means for arresting the rotation of the plug in closed position with the pressure port out of communication with said pressure line; and longitudinal lubricant grooves in the side faces of the plug so located and arranged as to be out of register with inlet, outlet and pressure openings in the valve body when the plug is in closed position engaging either the normal closed position stop or the auxiliary stop.

4. A valve comprised of a body including a plug seat and a rotary tapered plug engaging said seat, said plug having a central chamber extending through the larger end of the plug, inlet and outlet ports in the side walls of the plug communicating with suitable inlet and outlet passages in the valve body, and a pressure port in the said wall arranged to communicate with the inlet passage when the valve is in closed position, stop means for arresting the plug rotation with the ports in said closed position; and auxiliary stop means for arresting the rotation of the plug in a second closed position with the pressure port out of register with said inlet passage.

In testimony whereof, I have signed my name to this specification this 7th day of March, 1924.

ALBERT A. SNEBOLD.